US012025545B2

(12) United States Patent
Darsigny et al.

(10) Patent No.: US 12,025,545 B2
(45) Date of Patent: Jul. 2, 2024

(54) ANALYTICAL DEVICE AND METHOD FOR ASSESSING ANALYTE WITHIN A SAMPLE

(71) Applicant: SPI BIO INC., Sherbrooke (CA)

(72) Inventors: Mathieu Darsigny, Sherbrooke (CA);
Dominic Carrier, Verdun (CA);
Etienne Leveille, Sherbrooke (CA);
Etienne Lemieux, Sherbrooke (CA)

(73) Assignee: BIOALERT SOLUTIONS INC., Sherbrooke (CA)

( * ) Notice: Subject to any disclaimer, the term of this patent is extended or adjusted under 35 U.S.C. 154(b) by 892 days.

(21) Appl. No.: 16/478,261

(22) PCT Filed: Dec. 20, 2017

(86) PCT No.: PCT/CA2017/051552
§ 371 (c)(1),
(2) Date: Jul. 16, 2019

(87) PCT Pub. No.: WO2018/129607
PCT Pub. Date: Jul. 19, 2018

(65) Prior Publication Data
US 2019/0360902 A1    Nov. 28, 2019

Related U.S. Application Data

(60) Provisional application No. 62/446,687, filed on Jan. 16, 2017.

(51) Int. Cl.
*G01N 1/40* (2006.01)
*B01L 3/00* (2006.01)
(Continued)

(52) U.S. Cl.
CPC .............. *G01N 1/40* (2013.01); *B01L 3/5023* (2013.01); *G01N 21/76* (2013.01); *B01L 7/52* (2013.01);
(Continued)

(58) Field of Classification Search
CPC .......... G01N 1/40; G01N 21/76; G01N 21/69; G01N 2021/0325; G01N 2021/6482;
(Continued)

(56) References Cited

U.S. PATENT DOCUMENTS 5,128,104 A    7/1992  Murphy et al.
5,472,672 A *  12/1995 Brennan ............ G01N 35/1072
                                                         422/111
(Continued)

FOREIGN PATENT DOCUMENTS

WO    WO-2017043649 A1 *  3/2017 .............. C12M 1/00

OTHER PUBLICATIONS

International Search Report of PCT/CA2017/051552; dated Feb. 28, 2018; Anthony Glaser.
(Continued)

*Primary Examiner* — Dennis White
(74) *Attorney, Agent, or Firm* — BCF LLP

(57) ABSTRACT

The present technology relates to an analytical device for quantitative or qualitative analysis of one or more analytes in a sample. The analytical device comprises a reaction component and a capping component. The reaction component is capable of performing an analysis on a sample placed within an inner reaction chamber that is connected to an output end and conduit that eliminates the air or liquid component of the sample. Once the output end is sealed, the inner reaction chamber may be used as an extraction, reaction and analysis chamber with an optically clear path for interrogation of the sample. The analytical device may also feature a sealing device that seals the inner reaction chamber during analysis. The sealing device may also have an inner chamber for accommodating lyophilized reagents that can be added at any point during the procedure.

18 Claims, 16 Drawing Sheets

(51) Int. Cl.
  *B01L 7/00* (2006.01)
  *G01N 21/03* (2006.01)
  *G01N 21/64* (2006.01)
  *G01N 21/69* (2006.01)
  *G01N 21/76* (2006.01)

(52) U.S. Cl.
  CPC ..... *B01L 2200/16* (2013.01); *B01L 2300/042* (2013.01); *B01L 2300/043* (2013.01); *B01L 2300/047* (2013.01); *G01N 2021/0325* (2013.01); *G01N 2021/6482* (2013.01); *G01N 21/69* (2013.01)

(58) Field of Classification Search
  CPC ...... B01L 3/5023; B01L 7/52; B01L 2200/16; B01L 2300/042; B01L 2300/043; B01L 2300/047
  See application file for complete search history.

(56) References Cited

U.S. PATENT DOCUMENTS

| | | | | |
|---|---|---|---|---|
| 5,855,852 | A * | 1/1999 | Bienhaus | G01N 1/405 422/537 |
| 6,309,828 | B1 * | 10/2001 | Schleifer | B01L 3/0258 435/287.8 |
| 8,087,309 | B2 | 1/2012 | Kelley et al. | |
| 2002/0039783 | A1 | 4/2002 | McMillan et al. | |
| 2004/0228208 | A1 | 11/2004 | Papania et al. | |
| 2008/0293091 | A1 | 11/2008 | Kanipayor et al. | |
| 2018/0201922 | A1 * | 7/2018 | Okajima | C12M 1/26 |

OTHER PUBLICATIONS

Supplementary European Search Report of EP application No. 17891424, dated Sep. 2, 2020; Jörn Ueberfeld.

* cited by examiner

ANALYTICAL DEVICE AND METHOD FOR ASSESSING ANALYTE WITHIN A SAMPLE

CROSS-REFERENCE TO RELATED APPLICATION

This application claims the benefit of and priority to U.S. provisional patent application No. 62/446,687, filed Jan. 16, 2016, the content of which is herein incorporated in its entirety by reference.

FIELD OF TECHNOLOGY

This present technology generally relates to analytical devices for qualitatively assessing the presence of one or more analytes within a sample. The present technology also generally relates to analytical devices for making quantitative measurements of one or more analytes within a sample. The present technology further generally relates to integrated analytical devices and methods permitting sample analysis.

BACKGROUND INFORMATION

Analytic procedures to qualitatively assess de presence or quantitatively measure the concentration (e.g. molar, volume, mass or number) of one or more analytes in a sample are becoming more and more important in modern day medical, environmental and forensic sciences. Those procedures have been initially developed in chemical and biochemical laboratories by and for skilled artisans, but are more and more subject to automation. Nowadays, analytical instruments are able to perform analytic procedures on complex samples without the need of a technician. In some cases, the automation needed to isolate the analyte into a measurable form can be quite complex.

As the complexity increases, a percentage of the available analyte found in the initial sample may decrease due to loss or degradation and, as a result, will impact the detection limit of the method. This can be particularly restrictive when the analyte to be quantified is very dilute in the raw sample or when the analyte is a human, plant or animal pathogen with a low infectious dose. As an example, as few as 10 cells of enterohemorrhagic *Escherichia coli* are sufficient to start an infection in humans.

In other cases, the complexity of such device is increasing the challenge associated with fabrication and the cost to make.

As such, there remains a need in the art for an integrated analytical device that is simple to fabricate, cheap to make, easy to operate, that can process large volume of raw sample and recover high percentages of initial analytes found in the raw sample.

SUMMARY OF THE TECHNOLOGY

According to various aspects, the present technology relates to an analytical device for detection and/or quantification of one or more analyte within a sample; the analytical device comprising: a reaction component comprising an inner reaction chamber having a trapping element disposed therein for interaction with the one or more analyte, the reaction chamber comprising an input end; a capping component for capping the reaction component, the capping component being suitable for closure of the input end; and an output end in fluid communication with the reaction component for evacuation of fluids from the inner reaction chamber; wherein the inner reaction chamber is suitable for one or more of: trapping, extracting, and detecting the one or more analyte.

According to various aspects, the present technology relates to an analytical device as defined herein, wherein the sample is a fluid sample.

According to various aspects, the present technology relates to an analytical device as defined herein, wherein the reaction component is at least partially optically clear.

According to various aspects, the present technology relates to an analytical device as defined herein, wherein the inner reaction chamber is at least partially optically clear.

According to various aspects, the present technology relates to an analytical device as defined herein, wherein the capping component is at least partially optically clear.

According to various aspects, the present technology relates to an analytical device as defined herein, wherein the reaction component is connected to the capping component through a connecting device.

According to various aspects, the present technology relates to an analytical device as defined herein, wherein the connecting device is a hinge.

According to various aspects, the present technology relates to an analytical device as defined herein, wherein the sample is a fluid sample.

According to various aspects, the present technology relates to an analytical device as defined herein, wherein the output end is in fluid communication with a conduit directing the sample from the inner reaction chamber to a waste collection system.

According to various aspects, the present technology relates to an analytical device as defined herein, wherein the output end comprises a first sealing device suitable for controlling fluid communication between the inner reaction chamber and the output end.

According to various aspects, the present technology relates to an analytical device as defined herein, wherein the first sealing device is a cap, a valve, a septum, a lid or a plug.

According to various aspects, the present technology relates to an analytical device as defined herein, wherein the reaction component comprises a second sealing device suitable for controlling fluid communication into and out of the inner reaction chamber.

According to various aspects, the present technology relates to an analytical device as defined herein, wherein the second sealing device is a cap, a valve, a septum, a lid or a plug.

According to various aspects, the present technology relates to an analytical device as defined herein, wherein the capping component comprises a lid having a capping portion.

According to various aspects, the present technology relates to an analytical device as defined herein, wherein the capping portion has an inner cavity in fluid communication with the inner reaction chamber when the analytical device is in a closed configuration.

According to various aspects, the present technology relates to an analytical device as defined herein, wherein the capping component comprises a reagent receiving compartment.

According to various aspects, the present technology relates to an analytical device as defined herein, wherein the reagent receiving compartment comprises a reagent storing compartment and a flexible cover.

According to various aspects, the present technology relates to an analytical device as defined herein, wherein the reagent receiving compartment comprises a reagent storing compartment, at least one protective layer and a flexible cover.

According to various aspects, the present technology relates to an analytical device as defined herein, wherein the reagent storing compartment comprises an inner chamber in fluid communication with the inner reaction chamber.

According to various aspects, the present technology relates to an analytical device as defined herein, wherein the input end or the output end or both interface with a device capable of building differential hydraulic and pneumatic pressure into the inner reaction chamber.

According to various aspects, the present technology relates to an analytical device as defined herein, wherein the inner reaction chamber is surrounded by a heating sleeve. The heating sleeve being capable of providing heat in a controllable fashion.

According to various aspects, the present technology relates to an analytical device as defined herein, wherein interrogation of the sample is accomplished by at least one of an illumination system and a detection system.

According to various aspects, the present technology relates to an analytical device as defined herein, wherein information gathered by the interrogation of the sample is translated into a qualitative or quantitative assessment of the concentration of the one or more analyte.

According to various aspects, the present technology relates to an analytical device as defined herein, wherein the trapping element comprises at least one of a membrane, filter, paper, glass wool, polymer, gel, resin, bead matrix, magnet matrix, antibody coated matrix, nucleic acid probe coated matrix, aptamer coated matrix and chemical impregnated paper and chemical impregnated membrane.

According to various aspects, the present technology relates to an analytical device as defined herein, wherein the membrane is selected from polypropylene, track-etched polycarbonate, track-etched polyester, cellulose acetate, mixed-cellulose esters, nitrocellulose, nylon, polyvinylidene fluoride, polytetrafluoroethylene and polyethersulfone.

According to various aspects, the present technology relates to an analytical device as defined herein, wherein the membrane is hydrophilic.

According to various aspects, the present technology relates to an analytical device as defined herein, wherein the membrane is hydrophobic.

According to various aspects, the present technology relates to an analytical device as defined herein, wherein the reagent receiving compartment further comprises one or more protective layers.

According to various aspects, the present technology relates to an analytical device as defined herein, wherein the analytical device further comprises a sealing element for controlling fluid communication at the input end.

According to various aspects, the present technology relates to an analytical device as defined herein, wherein the analytical device further comprises a sealing element for controlling fluid communication at the output end.

According to various aspects, the present technology relates to an analytical device for detection for quantification of one or more analyte within a fluid sample; the analytical device comprising: a reaction component comprising: a cartridge having an inner reaction chamber, the inner reaction chamber comprising an input end for receiving the fluid sample and a trapping element for trapping the one or more analyte; wherein the cartridge and the inner reaction chamber are at least partially clear for optical interrogation of the fluid sample; and an output end in fluid communication with the reaction chamber for disposal of the fluid sample out of the reaction chamber; and a capping component for capping the output end of the reaction component, the capping component comprising: a lid comprising a capping portion, the capping portion having an inner cavity in fluid communication with the input end when the analytical device is in a capped configuration; and a reagent receiving compartment for receiving at least one reagent, the reagent receiving compartment comprising a reagent storing chamber having an inner chamber for storing the reagent and a flexible cover imparting movement of the at least one reagent from the inner chamber into the inner cavity of the capping portion and into the reaction chamber when the analytical device is in a capped configuration.

According to various aspects, the present technology relates to an analytical device as defined herein, wherein the reaction component is at least partially optically clear.

According to various aspects, the present technology relates to an analytical device as defined herein, wherein the inner reaction chamber is at least partially optically clear.

According to various aspects, the present technology relates to an analytical device as defined herein, wherein the capping component is at least partially optically clear.

According to various aspects, the present technology relates to an analytical device as defined herein, wherein the reaction component is connected to the capping component through a connecting device.

According to various aspects, the present technology relates to an analytical device as defined herein, wherein the connecting device is a hinge.

According to various aspects, the present technology relates to a multi-analysis analytical device for detection or quantification of one or more analyte within at least one fluid sample; the analytical device comprising: a reaction portion comprising a plurality of reaction components, each reaction component in the plurality of reaction components comprising: a cartridge having an inner reaction chamber, the inner reaction chamber comprising an input end for receiving the fluid sample and a trapping element for trapping the one or more analyte; wherein the cartridge and the inner reaction chamber are at least partially clear for optical interrogation of the fluid sample; and an output end in fluid communication with the reaction chamber for disposal of the fluid sample out of the reaction chamber; a capping portion comprising a plurality of capping components, each capping component in the plurality of capping components comprising: a lid comprising a capping portion, the capping portion having an inner cavity in fluid communication with the input end when the analytical device is in a capped configuration; and a reagent receiving compartment for receiving at least one reagent, the reagent receiving compartment comprising a reagent storing chamber having an inner chamber for storing the reagent and a flexible cover imparting movement of the at least one reagent from the inner chamber into the inner cavity of the capping portion and into the reaction chamber when the analytical device is in a capped configuration.

According to various aspects, the present technology relates to a method for performing an analytical detection or quantification of an analyte in a sample, the method comprising: introducing the sample into the inner reaction chamber of the analytical device or the multi-nalysis analytical device as defined herein; introducing one or more reagents suitable for the analytical detection or quantification of the analyte into the inner reaction chamber; and interrogating the inner reaction chamber to measure a reaction indicative of the analytical detection or quantification of the analyte.

According to various aspects, the present technology relates to a method for performing an analytical detection or quantification as defined herein, wherein the fluid sample is selected from air, water, food, drug, drinkable product, pharmaceutic product, therapeutic product, cell suspension, cell suspension from a surface swab, cell suspension from feces, cell suspension from a swab specimen, cerebrospinal fluid, amniotic fluid, biological fluid, blood, lymph, urine, mucus, sputum, pus and saliva.

According to various aspects, the present technology relates to a method for performing an analytical detection or quantification as defined herein, wherein the sample comprises least one of a viroid, virus, satellite virus, bacteriophage, spore, bacterium, archaebacterium, fungus, unicellular eukaryote, disrupted tissue from plant and disrupted tissue from animal.

According to various aspects, the present technology relates to a method for performing an analytical detection or quantification as defined herein, wherein the fluid sample has been pre-treated before being introduced into the inner reaction chamber with at least one of a filtration based on size, separation based on a chromatography method, reagent addition, chemical addition, pre-enrichment with cell growth media, incubation with a chemical, incubation with an antibody, incubation with an aptamer, incubation with a lectin, lysis with a lysis solution, lysis with an ultrasonic horn, lysis with bead beating, lysis with an enzymatic reaction, biochemical reaction step, chemical reaction, biochemical reaction and incubation with heat.

BRIEF DESCRIPTION OF THE DRAWINGS

The following schematics are meant to help the description of the technology and shall not be used to limit the possible applications of the technology.

FIGS. 13A-13B show schematic representations of an assembly of analytical devices according to one embodiment of the present technology, wherein FIG. 13A shows a cross-sectional view of the assembly wherein the sealing device partially closes the output end the inner chamber; and FIG. 13B shows a cross-sectional view of the assembly wherein the sealing device fully closes the output end of the inner chamber, the waste collection chamber and the conduit.

DETAILED DESCRIPTION

Figure 1A:
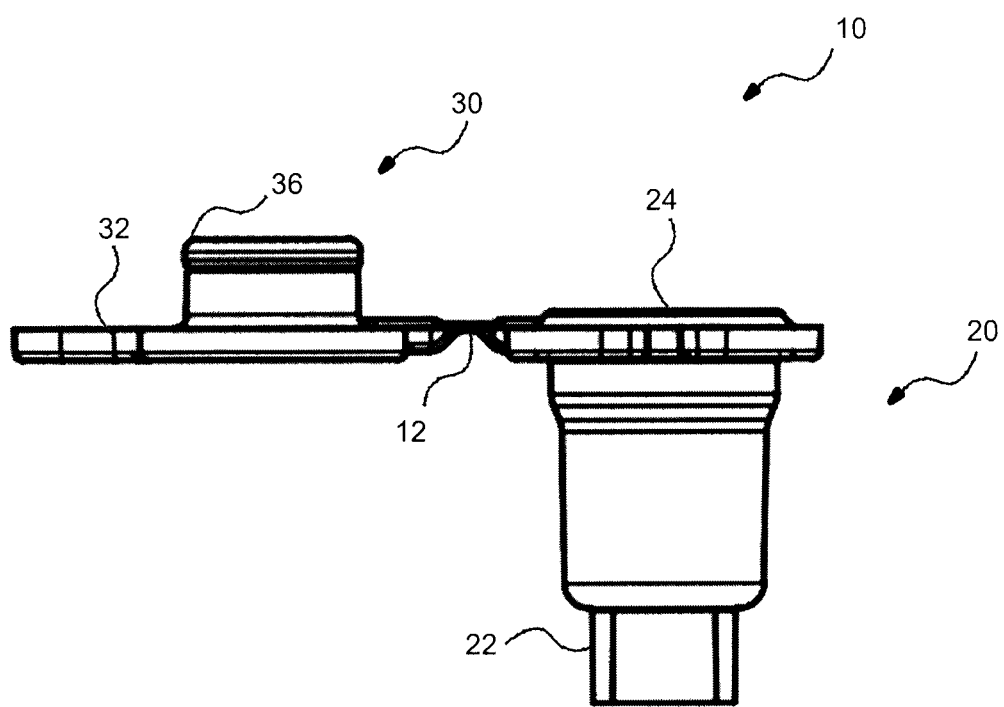
FIGS. 1A and 1B show schematic representations of an analytical device according to some embodiments of the present technology.

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which variations and additions do not depart from the present technology. Hence, the following description is intended to illustrate some particular embodiments of the technology, and not to exhaustively specify all permutations, combinations and variations thereof.

As used herein, the singular form "a," "an" and "the" include plural referents unless the context clearly dictates otherwise.

The recitation herein of numerical ranges by endpoints is intended to include all numbers subsumed within that range (e.g., a recitation of 1 to 5 includes 1, 1.5, 2, 2.75, 3, 3.80, 4, 4.32, and 5).

The term "about" is used herein explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

The term "fluid", as used herein, refers to any substance that has no specify shape, such as a gas a liquid or suspension of solids or organic matter or a substance that cannot resist any shear force applied to it.

As used herein, the term "reaction" refers to the reciprocal action or contact of chemical and/or biological agents upon or between each other.

As used herein, the term "analyte" refers to a substance or a chemical constituent that is of interest in an analytical procedure.

In one embodiment, the present technology relates to an analytical device for capturing, extracting, detecting and/or quantifying one or more analytes within a sample (such as a fluid sample or a solid sample). In some implementations of this embodiment, the analytical device is an integrated analytical device.

In one embodiment, the present technology relates to an analytical device for capturing and/or preparing one or more analytes found in a sample. In some implementations of this embodiment, the analytical device allows to qualitatively assess the presence of the one or more analytes in the sample. In some implementations of this embodiment, the analytical device allows to quantitatively measure the concentration of the one or more analytes in the sample. In some instances, the analytical device is a partially automated device. In some other instances, the analytical device is a fully automated device.

In one embodiment, the present technology relates to a method for capturing and/or preparing one or more analytes found in a sample. In some implementations of this embodiment, the method qualitatively assesses the presence of the one or more analytes in the sample. In some implementations of this embodiment, the method quantitatively measures the concentration of the one or more analytes in the sample. In some instances, the method is a partially automated method. In some other instances, the method is a fully automated method.

In one embodiment, the analytical device of the present technology comprises a reaction chamber which is used for one or more of: sample preparation, reagent addition, chemical reaction, enzymatic reaction and analyte detection. In some instances, the reaction chamber comprises a trapping element which may or may not be in direct contact with the reaction chamber. In the instances where there is a direct contact between the trapping element and the reaction chamber, such direct contact alleviates the need to transfer the sample and/or the analyte to another vessel or to analyze only a fraction of the sample.

In one embodiment, the analytical device of the present technology makes use of a physical and/or a chemical property of the analyte in order to separate the analyte from the other constituents of the sample. This allows, in some instances, to process a volume of sample that is larger than the final volume within which the detection and/or the reaction is to be carried out, thereby increasing the limit of detection or quantification of the method.

In one embodiment, the analytical device of the present technology may be used to detect the presence of an analyte in a sample and/or to quantify the analyte in the sample. In some instances, the sample is a fluid sample. The fluid sample may be a liquid or a semi-liquid or a gas. Examples of fluid sample include, but are not limited to, air, water, food, drug, drinkable product, pharmaceutic product, therapeutic product, cell suspension, cell suspension from a surface swab, cell suspension from feces, cell suspension from a swab specimen, cerebrospinal fluid, amniotic fluid, biological fluid, blood, lymph, urine, mucus, sputum, pus, saliva or the like.

The sample carries, for example, at least one analyte in the form of, for example, a cell, virus, satellite virus, bacteriophage, viroid, nucleic acid, protein, prion, allergen, hormone, peptide, amino acid, lipid, carbohydrate, metabolite, drug, cofactor, nucleotide or nucleoside. In some implementations, the analyte is initially found within a dead or live cell, virus, satellite virus, bacteriophage or viroid.

In one embodiment, the analytical device of the present technology may be used to verify if an analyte is present within a sample and/or to determine the concentration of an analyte within a sample. An example of such embodiment is the enzyme-linked immunosorbent assay (ELISA) method wherein antibodies are used for the capture and detection of an antigen.

In another embodiment, the concentration of an analyte may be determined and used to report the initial concentration of a biological particle which contains this analyte, such as when reporting the bioburden of certain pathogens in a raw sample. Examples of analytes with a known concentration per biological particle are, but not limited to, genetic units such as gene, promotor, non-coding and intergenic region contained in genomic DNA or RNA. Annotated genes with a sequence specific to a certain strain may be useful in the present device and method for the quantification of that organism. The genes stx1 and stx2 (shiga-like toxins) are examples of genes with sequences specifically associated with the shigatoxigenic serotypes of *E. coli*. A person skilled in the art will know how to choose a method (e.g. polymerase chain reaction) and reagents (e.g. oligonucleotides) to specifically identify the biological particle of interest.

In another embodiment, the analytical device of the present disclosure may be used in an automated procedure to evaluate the concentration or bioburden of a biological particle, or a plurality of biological particles, found in an initial sample, such as prion, viroid, virus, satellite virus, bacteriophage, spore, bacterium, archaebacterium, fungus, unicellular eukaryote, disrupted tissue from plant and disrupted tissue from animal. This procedure can be useful to measure the concentration of human or animal pathogens such as, but not limited to, *Acinetobacter baumannii, Aspergillus fumigatus, Bacillus anthracia, Candida albicans, Clostridium botulinum, Clostridium difficile, Clostridium perfringens, Clostridium tetani, Escherichia coli, Haemophilus influenzae, Legionella pneumophila, Listeria monocytogenes, Mycobacterium tubercolosis, Pseudomonas aeruginosa, Salmonella typhimurium, Staphylococcus aureus, Streptococcus pneumoniae, Streptococcus pyogenes, Mycoplasma pneumoniae, Treponema pallidum*, and *Vibrio cholera*. The analysis can also be a multiplex analysis that can detect more than one biological particle.

In some embodiments, the sample to be analyzed using the analytical device and the method of the present disclosure may be treated or modified before it is introduced into the analytical device of the present disclosure. The sample may be treated or modified such as with a filtration based on size, separation based on a chromatography method, by additions of reagents, chemical modification, pre-enrichment with a specific or general cell growth media, addition of a buffer, incubation with a chemical, incubation with an antibody, incubation with an aptamer, incubation with a lectin, incubation with a lysis solution, lysis with an ultrasonic horn, lysis with bead beating, lysis with an enzymatic reaction, chemical reaction, biochemical reaction or incubation with heat. In a particular situation, a pre-filtration step can remove a group of larger cells and debris from the sample that are irrelevant to the analysis. This may also allow to remove cells that are infected or colonized by the biological particle of interest (e.g. intracellular concentration) for which the free concentration in the fluid has to be quantified by the method (e.g. extracellular concentration).

In other embodiments, the sample to be analysed is a solid sample containing a solvent soluble component that can be extracted to process a fluid sample that can be processed by the analytical device and method of the present disclosure.

Figure 1B:
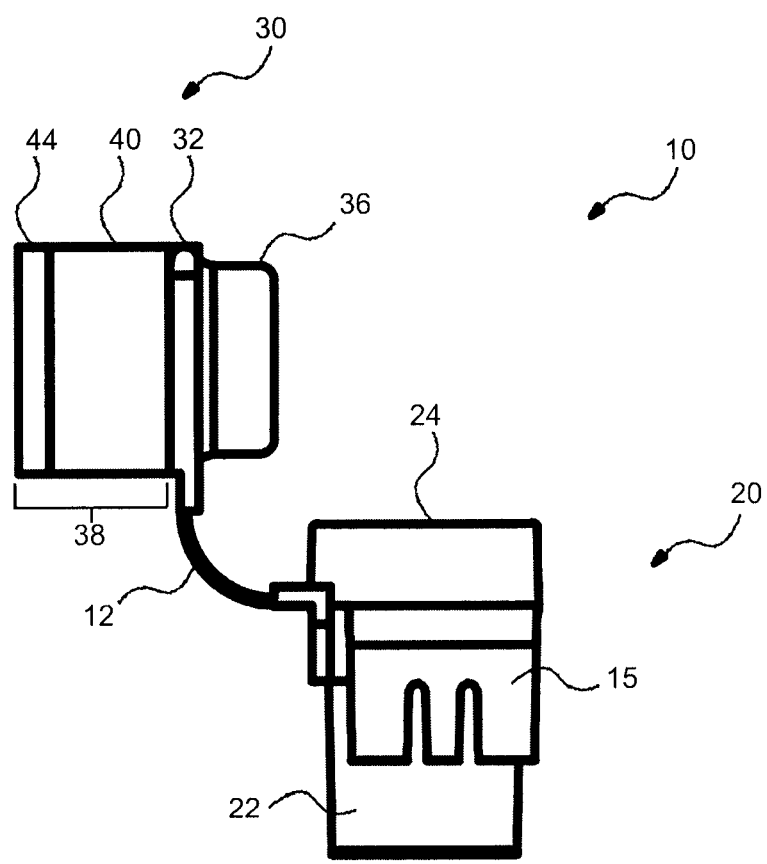
Figure 2:
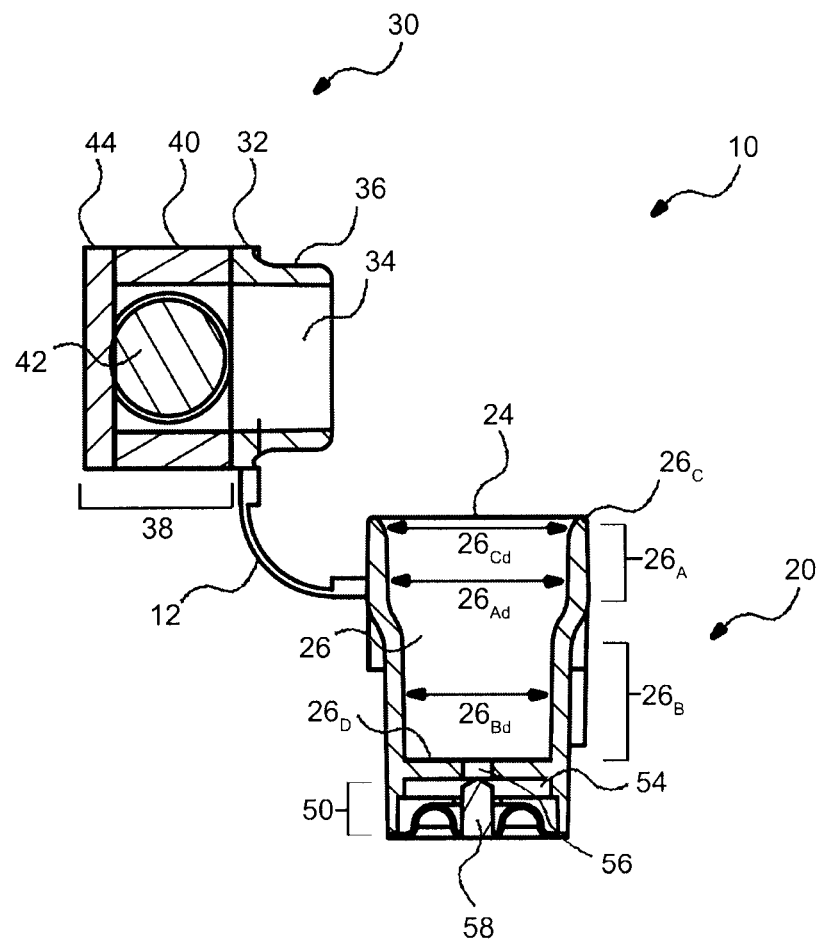
FIG. 2 shows a schematic cross-sectional side view of the analytical device shown in FIG. 1B.

FIGS. 1 and 2 each show an analytical device 10 according to one embodiment of the present disclosure. The analytical device 10 comprises a reaction component 20 and a capping component 30. In this embodiment, the reaction component 20 is attached to the capping component 30 via a connecting element 12 (e.g., hinge, joint or the like). However, in some other embodiments, the reaction component 20 and the capping component 30 are independent or separate from one another.

The analytical device 10 may be in a capped configuration wherein the capping element 30 is capping the reaction component 20. Alternatively, the analytical device 10 may be in an open configuration wherein the reaction component 30 is not capped by the capping element 30.

The reaction component 20 comprises a cartridge 22 having an inner reaction chamber 2 (FIG. 2). The upper portion of the cartridge 22 comprises an input end 24 throughout which a sample or a reagent may be introduced into the inner reaction chamber 26. In some instances, the reaction component 20 comprises a clip 15 for attaching the analytical device 10 to, for example, a tray (not shown) for movement of the analytical device 10 within an instrument (not shown). As best seen in FIG. 2, the inner reaction chamber 26 of the cartridge 22 has an upper portion $26_A$, coinciding with the input end 24, and a lower portion $26_B$. Although in this embodiment the diameter of the lower portion $26_{Bd}$ is smaller than the inner diameter $26_{Ad}$ of the upper portion $26_A$, variation in the diameters of both of the upper $26_{Ad}$ and the lower $26_{Bd}$ parts are possible without departing from the present technology. For examples, in other instances, the diameter of the upper portion $26_{Ad}$ may be similar to, identical to or smaller than the diameter of the lower portion $26_{Bd}$.

In some instances, the reaction component 20 is at least partially optically clear to allow interrogation of the sample by external instruments, such as with a spectrophotometer. For example, the cartridge 22 and the inner reaction chamber 26 are at least partially optically clear. In some instances, the capping component 30 is at least partially optically clear to allow interrogation of the sample by instruments (e.g., spectrophotometers) located in the periphery of the analytical device 10.

In some other instances, the reaction component 20 is opaque. In such instances, the cartridge 22 and the inner reaction chamber 26 are opaque. In some of these instances or in others, the capping component 30 is opaque. In such instances, the device of the present technology is used for other purposes than for interrogation of the sample using photo-spectral methods.

Optionally, the upper wall $26_C$ of the cartridge 22 is recessed with respect to the rest of the wall of the cartridge 22 so as to snugly engage with parts of the capping component 30 as will be described in greater details below. The upper wall $26_C$ may be provided with different shapes and forms, for example, the upper wall 26 may be of the same diameter $26_{Cd}$ as the diameter of the upper portion $26_{Ad}$ without departing from the present technology.

As shown in FIG. 1A, the capping component 30 comprises a lid 32 having a capping portion 36 that has a shape and a form suitable for fitting into the input end 24 of the cartridge 22 when the analytical device is in a capped configuration. In a capped configuration of the analytical device 10 (not shown), the capping portion 36 snugly fits into the input end 24 so as to cap the input end 24 in an airtight manner. In this embodiment, the capping portion 36 is of a shape that engages with the inner upper wall $26_C$ of cartridge 22 to ensure that the input end 24 is capped in an airtight manner. In other embodiments, as shown in FIG. 1B, the capping component 30 further comprises a reagent receiving compartment 38 adjacent to the lid 32. In this embodiment, the reagent receiving compartment 38 is disposed on top of the lid 32. The reagent receiving compartment 38 comprises a reagent storing compartment 40 and a flexible cover 44 adjacent to the reagent storing compartment 40. In this embodiment, the flexible cover 44 is disposed on the top surface of the reagent storing compartment 40.

As best seen in FIG. 2, the capping portion 36 of the lid 32 has an inner cavity 34 which is in fluid communication with the input end 24 when the analytical device 10 is in a capped configuration. The reagent storing compartment 40 has an inner chamber 42 for storing reagents. The inner chamber 42 is in fluid communication with the inner cavity 34 of the capping portion 36. The flexible cover 44 is used to move the reagents located in the inner chamber 42 into the inner cavity 34 of the capping portion 36 and eventually into the inner reaction chamber 26 of the cartridge 22.

In one embodiment, the reaction component 20 also comprise an output end 50 located below the cartridge 22. The reaction component 20 further comprises an exit canal 56 fluidly connecting the inner reaction chamber 26 to the output end 50, as shown in FIG. 2. In some instances, the lower portion $26_B$ of the inner reaction chamber 26 comprises a bottom surface $26_D$ from which extends exit canal 56. Exit canal 56 allows evacuation of some of the components of the sample or some of the reagents from the inner reaction chamber 26. The cartridge 22 also comprises a trapping element 52 (not shown in FIG. 2) which, in some instances, is deposited on the bottom surface $26_D$ of the inner reaction chamber 26. It will be appreciated that the trapping element 52 may be deposited on other inner surfaces or inner walls of the inner reaction chamber 26 without departing from the present technology. For example, the trapping element 52 may be deposited on the inner surface of the inner reaction chamber 26. The trapping element 52 is used to trap or capture the one or more analytes present in a sample to be interrogated. In some instances, a trapping element support (e.g., grillage or mesh) (not shown) is used to support the trapping element 52 onto the bottom surface $26_D$ of the inner reaction chamber 26. In some other instances, the trapping element 52 is secured by interference between the bottom part and the top part of the cartridge 22 during assembly. The trapping element 52 may also be kept in place by a retention mean (e.g., a ring) (not shown) that is placed or deposited on top of the trapping element 52.

In some embodiments, the output end 50 comprises a waste retention chamber 54 in fluid communication with the inner reaction chamber 26 via, for example, the exit canal 56. The waste retention chamber 54 allows accumulating and/or storing the sample exiting the inner reaction chamber 26 prior to discarding the sample through the waste management system (not shown). In some instances, a sealing device 58 controls the volume and rate of fluids entering and exiting the exit canal 56 and/or the waste retention chamber 54.

One way of operating the analytical device 10 includes introducing a fluid sample (e.g., treated/modified or untreated/unmodified) into the inner reaction chamber 26 via the input end 24 of the cartridge 22. The fluid sample accumulates temporarily in the inner reaction chamber 26 where it becomes in contact with the trapping element 52. The trapping element 52 selectively retains part of the constituents of the fluid sample based on one or more specific properties and/or forces. Examples of specific properties and/or forces, include, but are not limited to, size, electrostatic interaction, pi-interaction, van der Waals interaction, polarity, affinity, antigenicity and magnetism.

To exploit these properties and/or forces, the trapping element 52 can be, for example, but not limited to, a membrane, filter, paper, glass wool, polymer, gel, resin, bead matrix, magnetic matrix, antibody coated matrix, antigen coated matrix, nucleic acid probe coated matrix, aptamer coated matrix, chemical impregnated paper or chemical impregnated membrane. Any component from the mixture that does not possess or fit the specific property is eliminated from the inner reaction chamber 26 through the exit canal 56 and then through the output end 50 (e.g., the waste retention chamber 54).

The volume of sample that can be processed without saturating the trapping element 52 is proportional to the trapping element's trapping capacity which depends on the nature of the trapping element. For example, if the trapping element 52 is a filter, the trapping element's trapping capacity will be proportional to its surface area. Alternatively, if the trapping element 52 is a matrix, the trapping element's trapping capacity will be proportional to its volume or to, for example, the amount of antibody it comprises. The trapping element's capacity may also be influenced by the concentration of analyte as well as the concentration of contaminants present in the sample.

In some implementations, at least one wall of the inner reaction chamber 26 shares the same surface area as the trapping element 52. In these implementations, the final volume of analyte in its measurable form is compatible with the volume needed to perform the interrogation of the reaction chamber. In some implementations, the inner reaction chamber 26 and the trapping element 52 have a cylindrical shape of equal diameter. In some instances, the inner reaction chamber 26 holds between about 0 microliter and about 1000 microliters, between about 0 microliter and about 500 microliters, between about 0 microliter and about 250 microliters, between about 0 microliter and about 200 microliters, between about 0 microliter and about 150 microliters or between about 0 microliter and about 100 microliters of sample. Accordingly, the diameter of the trapping element 52 is preferably between about 0.25 mm and about 25 mm, between about 0.5 mm and about 25 mm, between about 1 mm and about 25 mm, between 2 mm and about 25 mm, between about 2 mm and about 20 mm, between about 2 mm and about 15 mm, between about 3 and about 20 mm, between about 3 mm and about 15 mm, between about 4 mm and about 20 mm, between about 4 mm and about 15 mm, between about 2 mm and about 13 mm, between about 3 mm and about 13 mm, or between about 4 mm and about 13 mm.

In some embodiments, the inner reaction chamber 26 accommodates about 125 microliters, about 100 microliters, about 90 microliters, about 85 microliters, about 80 microliters, about 75 microliters, about 70 microliters, about 65 microliters, about 55 microliters, about 50 microliters, about 45 microliters, about 40 microliters, about 35 microliters, about 30 microliters, about 25 microliter, about 20 microliters, about 15 microliters, about 10 microliters, about 5 microliters, about 2 microliters, or about 1 microliter of fluid.

In one embodiment, the trapping element 52 is a membrane filtration unit. In such embodiment, the trapping element may be made from materials such as, but not limited to, polypropylene, track-etched polycarbonate, track-etched polyester, cellulose acetate, mixed-cellulose esters, nitrocellulose, nylon, polyvinylidene fluoride, polytetrafluoroethylene, polyethersulfone, polysulfone or any other porous material with selective retention of the organism or analyte based on size.

In another embodiment, the trapping element 52 is a magnetic matrix that can retain superparamagnetic nanoparticles conjugated antibodies or antibody-coated superparamagnetic epoxy bead.

In a further embodiment, the trapping element 52 is a nucleic acid probe matrix, an aptamer matrix, an antibody matrix or a lectin matrix. The matrix can be, for example, any type of permeable solid support such as porous membrane, mesh material, cellulosic paper and polymers.

In a further embodiment, the trapping element 52 is a microporous material such as a membrane that retains and concentrates the constituents of interest based on their size. This membrane has pore size chosen to retain the biological particles to be analyzed but large enough to let pass smaller material not concerned by the analysis such as soluble or insoluble organic particles, soluble or insoluble inorganic particles, molecules, chemicals and inhibitors. In some instances, the pore size is between about 0.2 microns and about 500 microns. In some other instances, the pore size is between about 0.2 microns and about 5 microns to efficiently retain bacterial cells and let pass smaller constituents such as cell, virus, cell debris, ion, small organic and inorganic molecule, lipid, peptide, protein, amino acid, carbohydrate, metabolite, cofactor, DNA, RNA, nucleotide, nucleoside from the sample. In some other instances, the pore size is between about 0.02 microns and about 1 microns to efficiently retain viruses and let pass smaller constituents such as cell, virus, cell debris, ion, small organic and inorganic molecule, lipid, peptide, protein, amino acid, carbohydrate, metabolite, cofactor, DNA, RNA, nucleotide, nucleoside from the sample. In some other instances, the pore size is between about 1 microns and about 500 microns to efficiently retain fungi or eukaryotes and let pass smaller constituents such as cell, virus, cell debris, ion, small organic and inorganic molecule, lipid, peptide, protein, amino acid, carbohydrate, metabolite, cofactor, DNA, RNA, nucleotide, nucleoside from the sample. Constituents smaller that the pore size are eliminated by a waste collection system.

Once trapped by the trapping element 52, the retained analyte/constituents can be washed with a fluid to favor removal of contaminants and inhibitors or can be mixed with reagents that may modify the analyte/sample without affecting its interaction with the trapping element 52. Examples of wash fluids include, but are not limited to, phosphate buffered saline and tris(hydroxymethyl)aminomethane buffered saline. Examples of reagents are acids, bases, chaotropic agents, enzymes, antibodies, antigens, peptides, enzymatic substrates and chemicals. Those reagents can be kept in the inner reaction chamber 26 for a certain amount of time, with or without temperature control, before being flushed thorough the exit canal 56. Optionally, the remaining solvent may be removed using air flow, differential pressure and/or heat.

Figure 3:
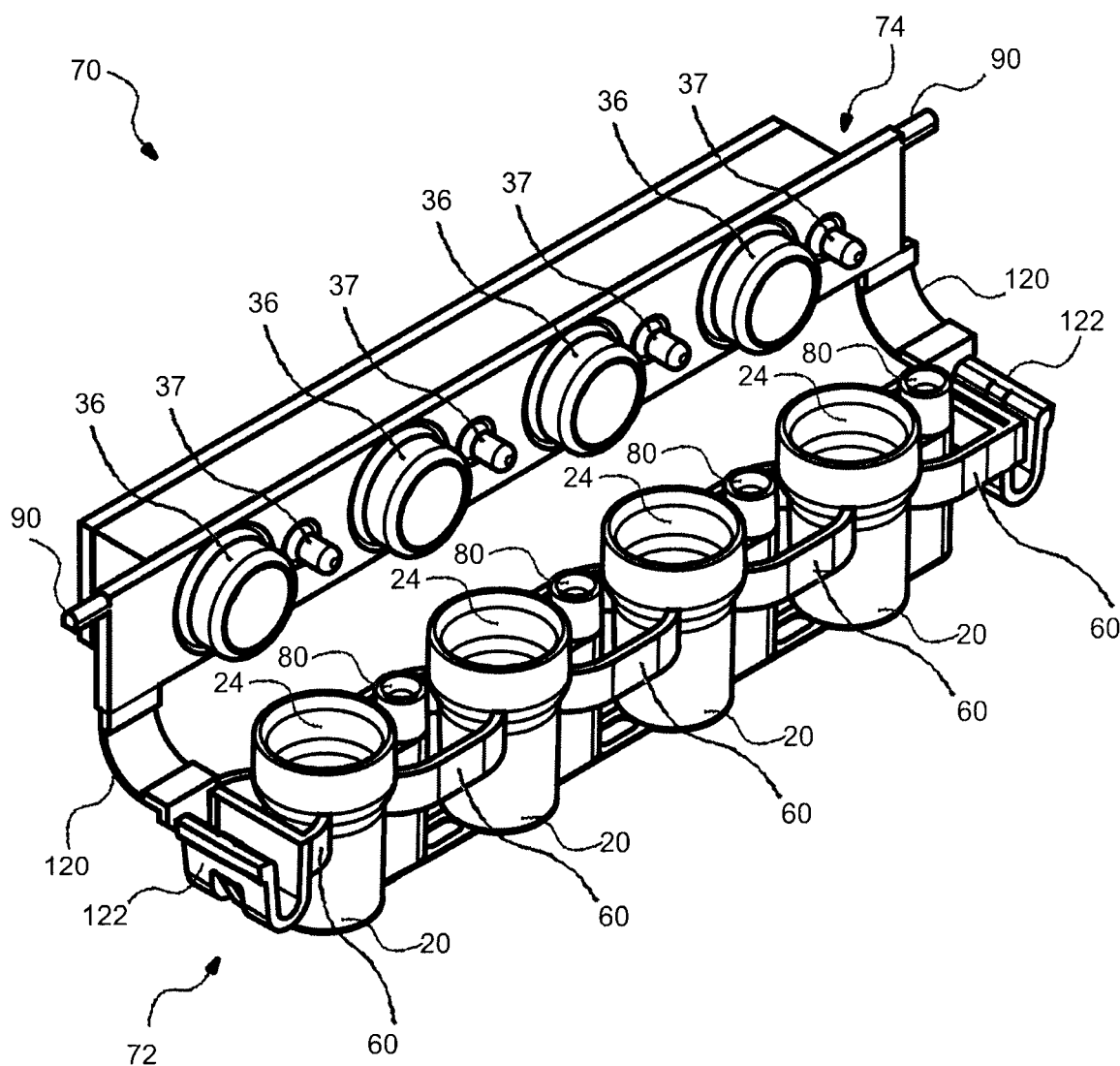
FIG. 3 shows a three-dimensional schematic representation of a plurality of analytical devices joined together to perform more than one analysis at a time according to one embodiment of the present technology.
Figure 4:
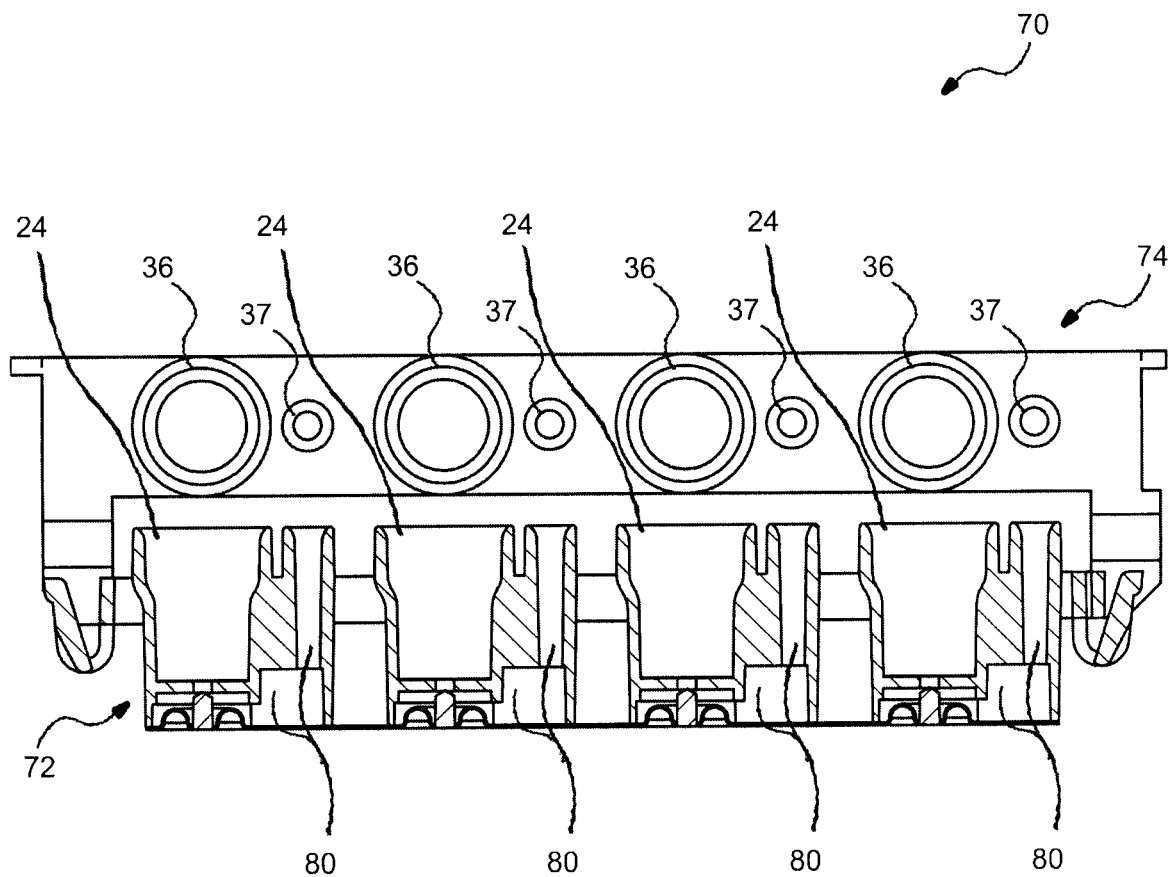
FIG. 4 shows a schematic cross-sectional front view of the analytical device of FIG. 3.
Figure 5:
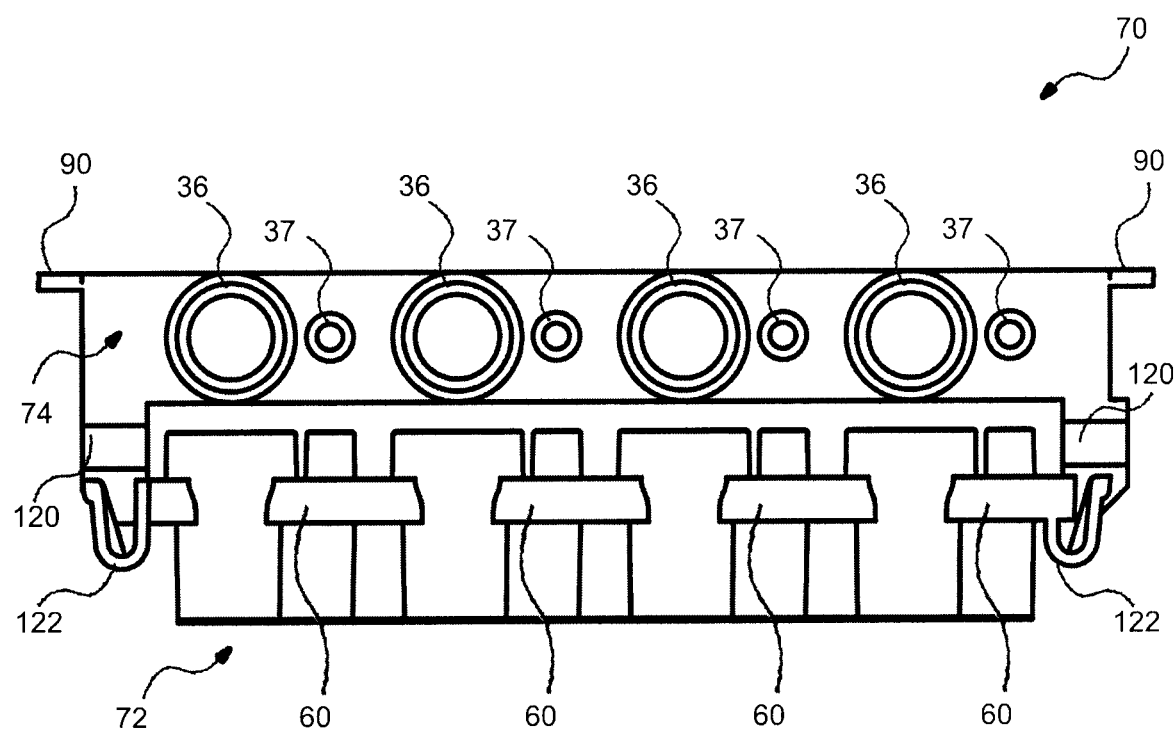
FIG. 5 shows a schematic side view of the analytical device of FIG. 3.
Figure 6:
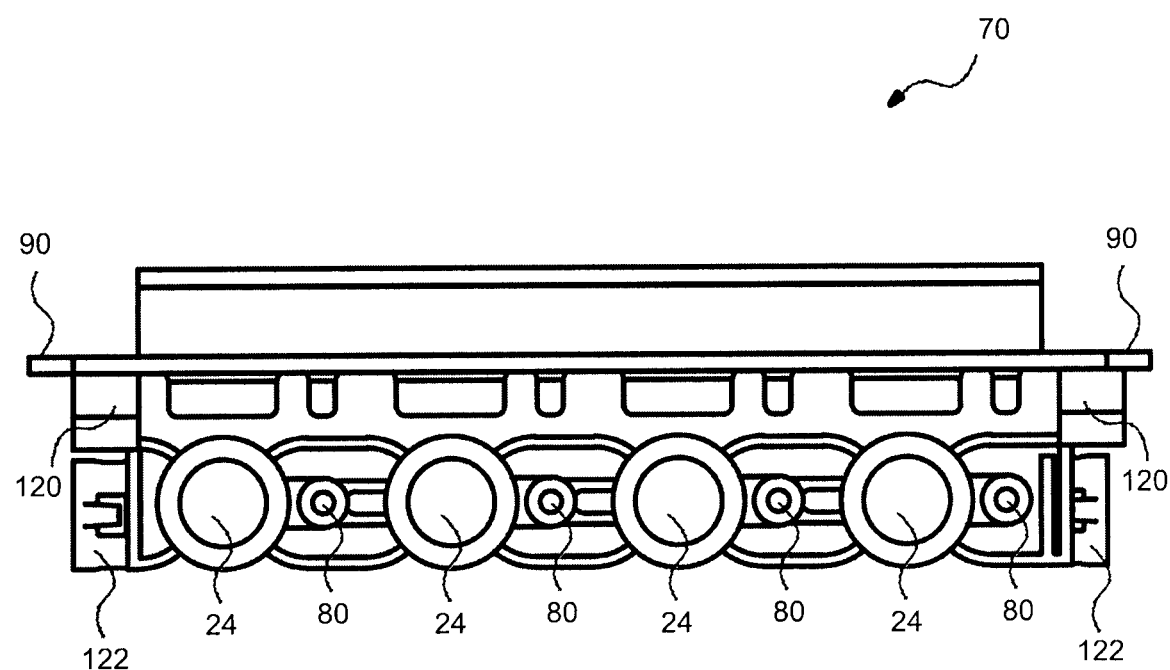
FIG. 6 shows a schematic top view of the analytical device of FIG. 3.

In some embodiments, the output end 50 may be in fluid communication with an additional waste management system (not shown) or waste disposal components (not shown) for assisting in disposal of fluids. For example, the fluid passing through the exit canal 56 is directed to a conduit 80 (see FIG. 3) connected to a waste collection system (not shown). This allows for large volumes of fluid to be analyzed so as to increase the detection limit of the method of the present disclosure. In some instances, the exit canal 56 may be sealed with a sealing device 58 to prevent loss of any subsequent addition to the inner reaction chamber 26. This sealing device 58 can be a valve, cap, septum or plug. In a preferred embodiment the sealing device 58 is incorporated into the cartridge 22 during assembly and may possess two states. The primary state lets fluid reach the waste collection system, whereas the secondary state leaves the exit canal 56 sealed. In the context of an automatized instrument, the state of the sealing device 58 may be modified by, for example, mechanical, hydraulic or pneumatic devices. In another preferred embodiment of the analytical device of the present disclosure, the input end 24 may be capped at any point during the procedure with the capping portion 36. Capping portion 36 may be a temporary or permanent seal to prevent evaporation, spills and cross-contamination to or from the inner reaction chamber 26. In a preferred embodiment, the capping portion 36 is a cap that can snap into the input end 24. Alternatively to the capping portion 36, the input end 24 may be sealed with a sealing device similar to the sealing device 58 used for sealing the exit canal 56. The sealing device may be a valve, a cap, a septum, rubber or a plug.

In some embodiments, the inner cavity 42 of the reagent storing compartment 40 may store a reagent or a plurality of reagents. Release of the content placed into the inner cavity 42 may be facilitated by pushing flexible cover 44 so as to release the reagents into the inner cavity 34 of the capping portion 36 and then into the inner reaction chamber 26 of the cartridge via the input end 24. In some instances, flexible cover 44 relies on the viscoelastic properties of an elastomer made of thermoplastic or thermosetting polymer or any other collapsible structure such as a thermoplastic blister that will not break during the travel needed to release the content (or under the pressure exerted). Again, in the context of an automatized instrument, such as will be discussed later, the flexible cover 44 can be pressed by, for example, mechanical, hydraulic or pneumatic devices. In some instances, the analyte can already be discriminated from background. In other cases, the analyte cannot be directly discriminated from background and will need further preparation by adding reagents. For example, the analyte may be initially contained within a dead or live cell, virus, satellite virus, bacteriophage or viroid that has been captured by the trapping device, washed with the wash fluid, dried air flow, differential pressure or heat and as such, a lysis solution will be required to access the analyte. The lysis solution should be compatible with the downstream analysis of the analytes as it ideally included in its entirety to reduce dilution and increase the limit of detection. As long as those reagents are compatible with the downstream analysis, it may include one or more of an acid, base, chaotropic agent, detergent, enzyme, salt and buffers. Examples of nonionic detergents that are compatible with many enzymatic reactions include, but are not limited to, Tween® 20, Triton X-1®, Nonidet® P-40 and Tergitol®. This can be followed by a second reagent addition such as one that will neutralize the lysis solution. Examples of reagents found in neutralizing solutions are acid, base, detergent, salt and buffer. The neutralization solution may further comprise reagents that are needed for the analysis, such as enzymes, proteins, nucleotides and oligonucleotides. At any point, processes and reactions may receive heat in a controlled manner.

In the context of an automated analytical instrument, the reagents added to the chamber can be deposited with an injector or a tip (for example, connected to manifolds, reservoirs and use fluid pumps, valves or sensors). Those solutions may further include reagents having the capacity to identify and amplify the analyte, transform the analyte into a measurable form, start a chemical reaction or start a biochemical reaction that will eventually lead to a detectable signal above background. Examples of such reagents include those reagents used in polymeric chain reactions, namely nucleotides, oligonucleotide primers, salts, buffers and polymerase enzymes. Other examples of such reagents include those used in electrochemiluminescence reaction, namely, buffer, salts, enzyme-linked antibodies (e.g., horseradish peroxidase enzyme, alkaline phosphatase), enzymatic substrates and electrochemiluminescence enhancers.

In some embodiments, a labile reagent is required for the analysis procedure. In such situations, a labile reagent cannot be kept in a solvent. Labile reagents are stored in a sealed section of the capping component 30 (e.g., reagent storing compartment 40) or of the reaction component 20 (e.g., cartridge 22) so that it is protected from atmospheric agents such as light, water and air. Thin metal foils, such as an aluminum foil may be used to seal reagents from atmospheric agents. To prolong the shelf life, labile reagents may have been dried or lyophilized with or without excipients in a low humidity environment. Lyophilized reagents are freeze-dried into specific shapes such as a sphere, cube or cylinder. Lyophilized reagents may be delivered at any point during the analysis procedure through the input end 24. The analyte or reaction product can be discriminated from background using a specific property to be interrogated using the at least partially optically clear path to provide a signal. This property is usually either the capacity to emit a particle such as phosphorescence, luminescence or radioactivity, or else the capacity to absorb a particle of a specific energy (i.e., wavelength and frequency) and transmit a particle of a different distinguishable energy (e.g., absorbance, fluorescence). The instrument may therefore feature at least one of a detector and illumination system. At any point, the signal may be preceded by signal enhancement or signal filtering. The signal is then compared to a previously established standard or an intra-assay standard to be expressed as a numerical value (i.e., quantitative), usually accompanied by a measurement unit and measurement error, or a descriptive value (i.e., qualitative). The quantification or qualitative detection may be based on the amplification of one or more nucleic acid molecule such, as for example, single strand RNA, single strand DNA, RNA/DNA hybrid, double strand DNA of the organism or group of organism species by nucleic acid amplification technology. These nucleic acids can be genomic DNA, mitochondrial DNA, episomal DNA, plasmidic DNA, messenger RNA, microRNA, small interfering RNA, viral RNA, viral RNA/DNA hybrid or viral DNA. The amplification of nucleic acids relies on nucleic acid amplification technologies (NAAT) and methods of quantification that are well known in the art. They are methods of signal amplification, capable of generating millions of nucleic acid copies from one starting copy of the targeted sequence. When reaction efficiency is known and taken into account, they become directly proportional to the initial concentration of the analyte in the initial sample. Examples of NAAT are, but not limited to, polymerase chain reaction (PCR) using polymerase enzyme (e.g., Taq polymerase) or strand-displacing polymerization techniques such loop-mediated isothermal amplification (LAMP) or strand displacement amplification (SDA) using strand-displacing polymerase enzymes (e.g., Bst polymerase). Quantification of the nucleic acids is performed using the optically clear portion of the extraction chamber that doubles as a reaction chamber using fluorescent dyes that bind to the newly synthetized nucleic acids. In some embodiments, an optical module made of at least one of a LED and optical filter is used to excite a double-stranded DNA fluorophore that binds the newly amplified DNA. The dye reemits light proportionally to the amount of double-stranded DNA and is measured by an optical module made of at least one of a photodiode and optical filter. Examples of fluorophores used in NAAT are dyes such as, but not limited to, SYBR® Green I, EvaGreen®, SYTO®-13, LC Green®, Bryt Green®, LightCycler 480® Resolight, and BOXTO. Other methods of quantitative PCR exist in the art and should be easily applied by any skilled artisan.

The technology of the present disclosure may also interface with other elements useful for analysis automation or semi-automation in an analytical instrument. For example, the analytical device of the present disclosure can be attached to a tray such as a carrousel that provide multiple strips of analytical devices needed to repeat the procedure over hours, days or weeks, depending on the capacity. An indexation mechanism may be used to load each of the unused strip at a specific location of the instrument to perform an analysis.

A heat source provided by an interface such as a thermal sleeve going around the integrated analytical device may be used during the extraction of the analytes to help with, for example, the lysis of the cells. It may be later used to adjust the temperature of the lysate to a specific temperature at which reagents such as enzymes may have their best processivity for the detection of the analytes. A Peltier element, heat sink and fan may also be used to change and control the temperature of the thermal sleeve according to a specific temperature profile. Such features are particularly useful in nucleic acid amplification technology such as polymerase chain reaction. To prevent evaporation, a heated lid may be needed during steps where the device's temperature is raised above the ambient. To cap or plug the input and output ends of the device, the instrument may have actuators, levers or motors. To add fluid, the device may interface with an injector connected to manifolds, reservoirs and use fluid pumps, valves or sensors to control the fluid. The raw fluid sample may be automatically sampled by the instrument and added by the input end of the integrated device. Such programmed or on demand sampling can be made on large volumes of fluid such as indoor and outdoor air, lakes, rivers, municipal water systems, industrial water systems, waste water treatment systems, domestic and industrial hot water systems, domestic and industrial heat exchanger (e.g., air conditioning and refrigeration).

In another embodiment, the reaction component 20 may feature a collection device (not shown) to temporally store the sample until it can be fully processed by the analytical instrument. The automated nature of the instrument may further include digital and analog electronic devices that control remotely or locally parts of the analytical device. Although in some embodiments, the analytical device is designed to interface with a fully automated instrument, the raw or modified fluid sample may also be added manually to the analytical device, as well some or all of the reagents. Other operations could also be controlled or executed manually.

In FIGS. 3, 4, 5 and 6, many analytical devices 10 of the present disclosure have been joined together with bridges 60 to form a multi-analysis integrated analytical device 70. The multi-analysis integrated analytical device 70 comprises a reaction portion 72 comprising more than one reaction components 20 and a capping portion 74 comprising more than one capping components 30. The reaction portion 72 is joined to the capping portion 74 via a connecting element 120 (e.g., hinge). In this embodiment, the reaction components 20 are aligned with the capping components 30 so that in the capped/closed configuration of the multi-analysis integrated analytical device 70, the capping components 30 register with the reaction components 20. In this embodiment, the multi-analysis integrated analytical device 70 comprises a plurality of conduits 80, capping portions 36 and 37 as well as tabs 90. Conduits 80 allow elimination of fluids exiting the reaction components 20 through the output end 50. Capping portions 36 and 37 are suitable for capping input ends 24 and conduits 80 respectively. Tabs 90 direct simultaneous closure of the input ends 24 with the capping portions 36 and closure of the conduits 80 with capping portions 37. In some variants, an attachment means 122 such as a clip is attached onto the reaction portion 72 to attach the multi-analysis integrated analytical device 70 to an analytical instrument (not shown).

Figure 7A:
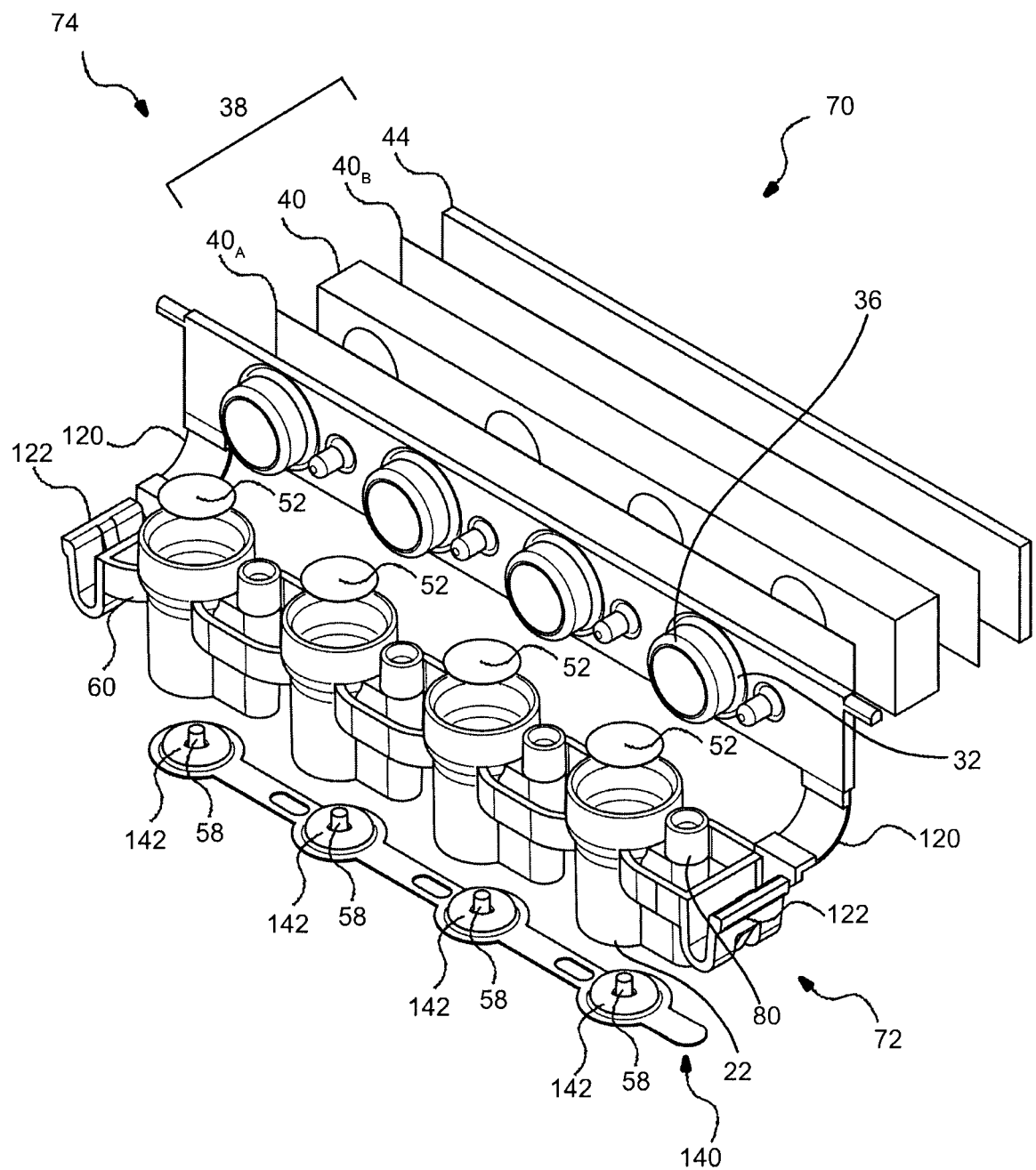
FIGS. 7A-7B show schematic side elevated and exploded views of an analytical device according to one embodiment of the present technology.

FIG. 7A illustrates an embodiment of the assembly of the multi-analysis integrated analytical device 70. In this embodiment, the integrated analytical device 70 comprises thermoplastic parts obtained by conventional processes such as, but not limited to, injection molding, compression molding, blow molding or thermoforming. Examples of suitable thermoplastics include acetal, acrylic, acrylonitrile butadiene styrene, polypropylene, polysulfone, polycarbonate, nylon, polyether ether ketone, polyether imide, polybutylene terephthalate, polyethylene terephthalate, polyphenylene sulfide, polyphenylene ether, polytetrafluoroethylene. The material is preferably clear so as to provide at least one optically clear path for the interrogation of the inner reaction chamber. The material preferably withstands temperatures of between about 0° C. and about 95° C., between about −20° C. and about 100° C., or between about −40° C. and about 120° C. The thickness of the thinnest walls of the analytical device 70 is between about 0.25 mm and about 5 mm, between about 0.5 mm and about 2.5 mm, between about 0.5 mm and about 2 mm, between about 0.2 mm and about 1 mm, or about 0.5 mm. Additional materials such as viscoelastic materials and foil materials may be used to complete all features.

A first part is assembled that comprises the reaction portion 72 (comprising inter alia cartridges 22, conduits 80, and bridges 60), the capping portion 74 (comprising inter alia lids 32, capping portions 36, reagent receiving compartments 38 each comprising the reagent storing compartment 40 and the flexible cover 44), the connecting element 120 and the attachment means 122. In this embodiment, the trapping element 52 is deposited on the bottom surface $26_D$ of the inner reaction chambers 26 of the cartridges 22. The capping portion 74 is assembled by placing the reagent storing compartment 40 on the top surface of the lid 32. The reagent storing compartment 40, preferably a thermoplastic obtained by conventional processes such as injection molding, compression molding, blow molding or thermoforming, is bonded on one side to protective layer $40_A$ and of the other side to protective layer $40_B$ before adding the flexible top 44 on top of protective layer $40_B$. The parts are held 20 together by interference, glue or thermal bonding. The heat can be direct heat or created from friction (e.g. ultrasonic waves). In some instances, protective layers $40_A$ and $40_B$ are aluminum sheets.

In some instances, a further part is provided that comprises sealing element 140 for sealing the output ends 50. Sealing element 140 comprises a plurality of sealing parts 142 for sealing the exit canals 56. In some implementations such as illustrated in FIG. 7A, each one of the sealing parts 142 comprise a protrusion acting as sealing device 58.

Figure 7B:
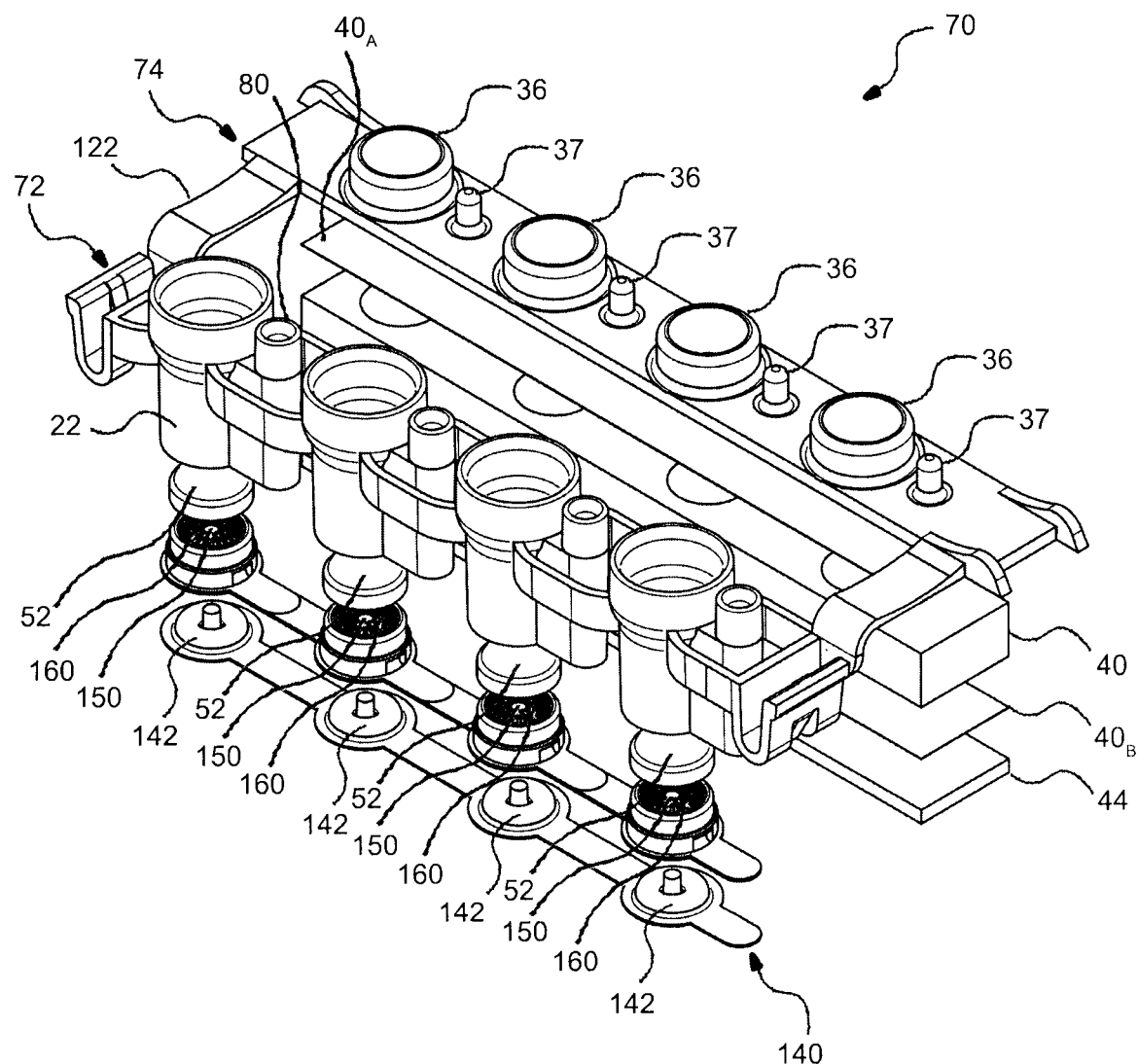
Figure 8:
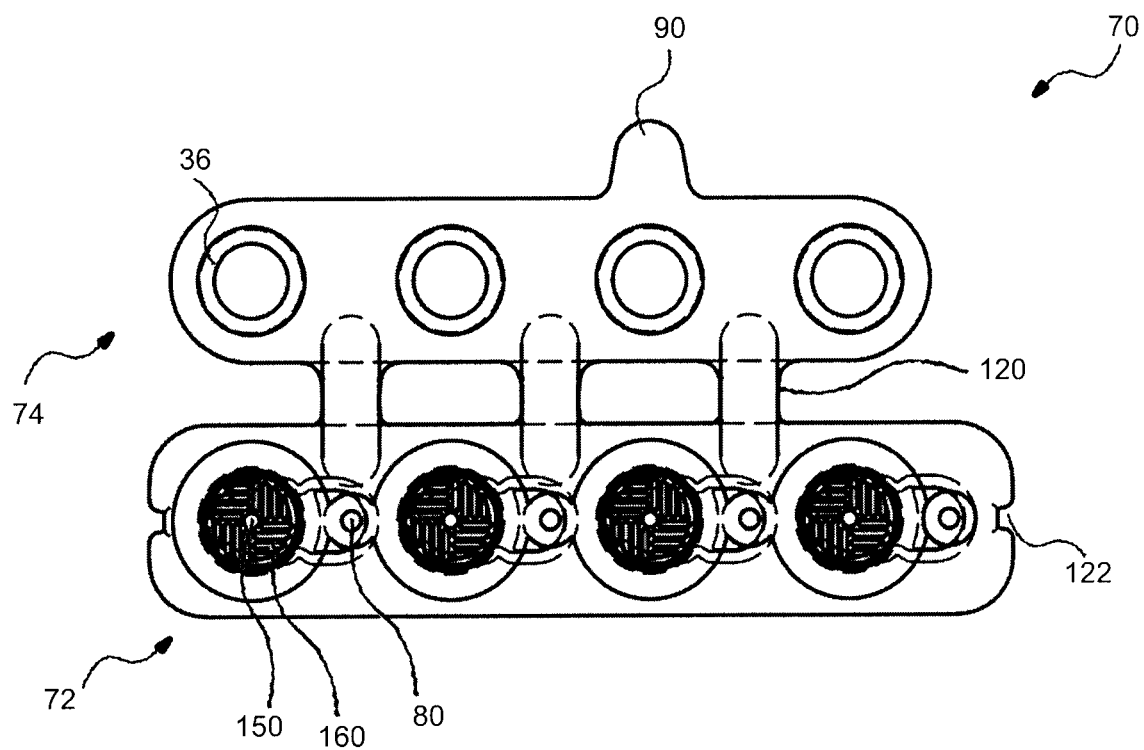
FIG. 8 shows a schematic top view of the assembly of an analytical device according to one embodiment of the present technology.
Figure 9:
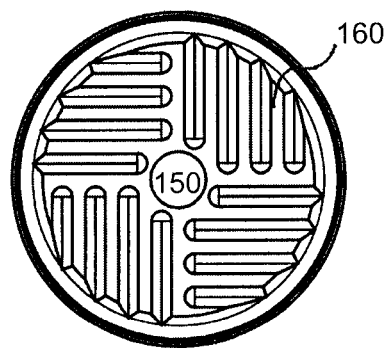
FIG. 9 shows a schematic top view of a trapping element support according to one embodiment of the present technology.

FIG. 7B and FIG. 8 show another embodiment of assembly of the multi-analysis integrated analytical device 70. In this embodiment, a first part is provided comprising the reaction component 72 (comprising inter alia cartridges 22, conduits 80, and bridges 60), the capping portion 74 (which is shown in FIG. 7B in the open configuration with the top surface facing downwardly) (comprising inter alia lids 32, capping portions 36, reagent receiving compartments 38 each comprising the reagent storing compartment 40, protective layers $40_A$ and $40_B$, and the flexible top 44), the connecting element 120 and the attachment means 122. In this embodiment, the inner reaction chamber 26 of the cartridge 22 is provided without a bottom surface $26_B$. A bottom surface is provided separately by a third part comprising the trapping element 52 bounded (e.g., glued or thermally bounded) to a trapping element support 160. In this embodiment, the trapping element 52 and the trapping element support 160 have an aperture 150 in their center (FIG. 9) to accommodate the protrusion of the sealing element 140. The sealing element 140 completes the bottom part of the cartridge 20. To assemble the capping component 74, the reagent storing compartment 40, preferably a thermoplastic obtained by conventional processes such as injection molding, compression molding, blow molding or thermoforming, is bonded on one side to protective layer $40_A$. The opposing side is then bounded to protective layer $40_B$. The flexible cover 44 is then placed on top of protective layer $40_B$. In order to move a reagent that is placed in the inner chamber 42 of the reagent storing compartment 40 into the inner reaction chamber 26 of the cartridge 22, a force is applied onto the flexible cover 44 in order to break or pierce the protective layer $40_B$ and press on the reagent which in turns breaks the protective layer $40_A$ and moves the reagents sequentially through the inner cavity 34 of the capping portion 36, the input end 24 and the inner reaction chamber 26 of the cartridge 22. In some implementations, a piercing element (not shown) is used to facilitate perforation of the protective layer $40_A$ and/or the protective layer $40_B$. Such piercing element may be present in, for example, the inner chamber 42 of the reagent storing compartment 40 and pierces the protective layer $40_A$ and/or the protective layer $40_B$ when a force applied thereon.

The various parts of the reaction component 72 and of the capping component 74 may be hold together by interference, glue or thermal bonding. When thermal bonding is used, the heat can be direct heat or created from friction (e.g. ultrasonic waves).

Identification of equivalent devices and methods are well within the skill of the ordinary practitioner and would require no more than routine experimentation, in light of the teachings of the present disclosure. Practice of the disclosure will be still more fully understood from the following examples, which are presented herein for illustration only and should not be construed as limiting the disclosure in any way.

EXAMPLES

The examples below are given so as to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

Example 1—Detection Efficacy of Quantification Method

*Escherichia coli* was used as a model organism of gram negative bacteria to show 80% or higher detection efficacy when using the analytical device and method according to one embodiment of the present disclosure. Lysis was performed with a nucleic acid amplification technology (NAAT) compatible solution and neutralization was performed with a NAAT compatible solution and Q-PCR reagents were added to start the quantification reaction without any further purification or dilution of the genetic material. A fresh culture was quantified by DO600 method and diluted to different concentrations. Three different samples of live *E. coli* cells (1E5, 1E4 and 1E3 cells) were manually placed into an inner reaction chamber via the input end. The cells were lysed by adding the following reagents to a polypropylene reaction chamber with a disc of track-etched polycarbonate (PCTE) as trapping element: 15 µl of 20 mM KOH, 1% Triton X100. All samples were incubated at 75° C. for 30 minutes. The lysis solution was then neutralized by addition of 6 µl of Tris-Cl to a final pH of 8.3.

Figure 10:
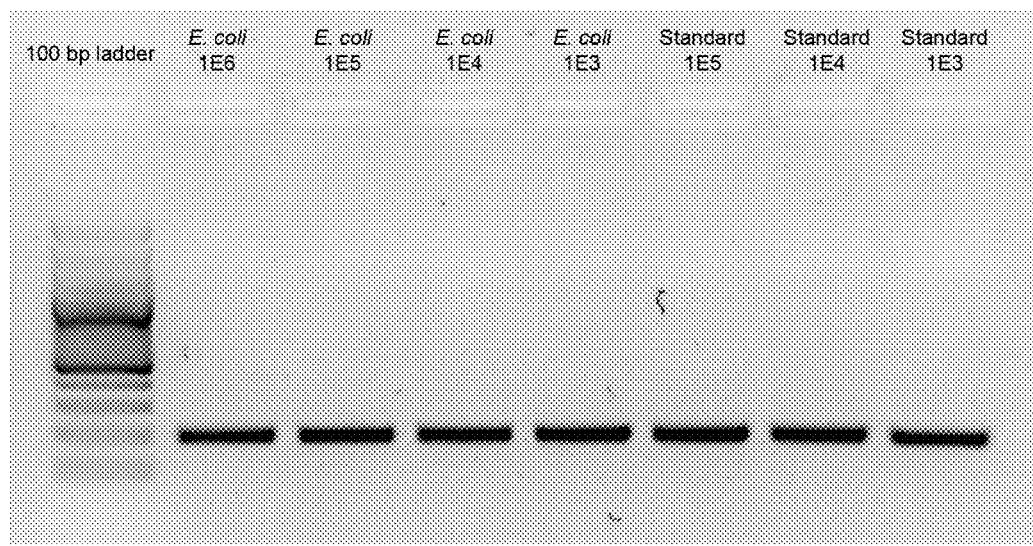
FIG. 10 shows the picture of an electrophoresis gel indicating the result of the Q-PCR as described in Example 1.

In parallel, equivalent quantities of *E. coli* cells were lysed with 5% Chelex-100® in water for 15 minutes at 95° C. to represent the golden standard in crude DNA extraction. At this point, a Q-PCR reaction mix was added to the diluted Chelex-100® extractions and the undiluted lysis samples prepared with the method to a final concentration of 6 mM Tris-Cl, 20 mM KCl, 3 mM MgCl2, 0.3×SYBR green I, 0.25 µM of a forward primer against the 16S gene, 0.25 µM of a reverse primer against the 16S gene, 0.2 mM of each dNTP and 3 units of Taq polymerase in a final volume of 60 The Q-PCR program was 95° C. for 5 minutes followed by 45 cycles of 95° C. for 20 seconds, 60° C. for 20 seconds and 68° C. for 25 seconds. Amplicon length were verified by 1.5% agarose gel electrophoresis at 110 volts for 20 minutes with ethidium bromide in TAE 1× as presented in FIG. 10. The percentage of detection efficacy was compared with each Chelex-100® control and is presented in Table 1.

TABLE 1

Detection efficacy of the proposed method for different amounts of *E. coli* cells

| Total *E. coli* cells | Method | % Efficiency |
|---|---|---|
| 1.00E+05 | Alkaline lysis, PCTE method | 124 |
| 1.00E+04 | Alkaline lysis, PCTE method | 90 |
| 1.00E+03 | Alkaline lysis, PCTE method | 80 |

Example 2—Linearity of the Quantification Method

Figure 11:
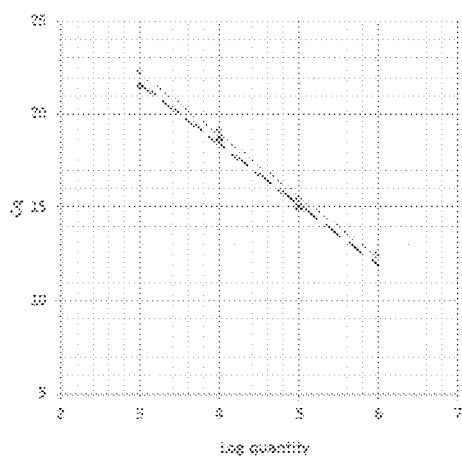
FIG. 11 shows a graph of the quantitative cycle (Cq) plotted against the LOG 10 of the concentration of each standard and samples as well as the linear regression analysis of the data with the associated coefficient of determination (R2) and equation. ■ Standard curve; ● Q-PCR on DNA from method; - - - Linear (Standard curve) $y=-3.291x+32,059$; $R^2=0.9986$; ... Linear (Q-PCR on DNA from method); $y=-3.26x+31.44$; $R^2=0.9944$.

The linearity of the quantification of the samples of Example 1 was also compared to the linearity of the quantification of purified genomic DNA samples of *E. coli*. The quantitative cycle (Cq) was plotted against the log 10 of the concentration of each standard (1E5, 1E4 and 1E3 genomic units) and samples (1E6, 1E5, 1E4 and 1E3 *E. coli* cells), the results are shown in FIG. 11. The R2 index for a linear relationship between these two variables was 0.9986 for the DNA standards and 0.9944 for the serial diluted *E. coli* samples extracted with the analytical device and method as defined herein.

Example 3—High Retention Rate of Cells Using the Device

The device according to one embodiment of the present disclosure was used as a filtration module to capture most of the microorganisms of interest before proceeding to its quantification. A disc of polypropylene membrane with pore size of 0.45 micron was cut to a diameter of approximately 4 mm and thermally bonded at the bottom of the inner reaction chamber. A suspension of 1E5 *E. coli* cells per mL was circulated in the device at 20 PSIG of pressure and the filtrate portion was conserved. To demonstrate the high retention rate of the device, the filtrate was plated on nutritive agar media. The next day, colonies were enumerated to determine how many cells had not been captured. Table 2 displays the average % of cells retained by the device after 12 assays. Also, flow rate across the membrane was measured during the assay and averaged 33.5 mL/min/cm$^2$ at 20 PSIG which is close to the expected value. The flow was not affected by the presence of the valve.

TABLE 2

Retention rate of *E. coli* cells using the device

| Total *E. coli* cells circulated | Average retention rate (%) | Standard deviation on the retention rate (%) |
|---|---|---|
| 1.00E+05 | 99.2 | 1.9 |

Example 4—Reaction Component's Sealing Device Resistance to Leaking

Figure 13A:
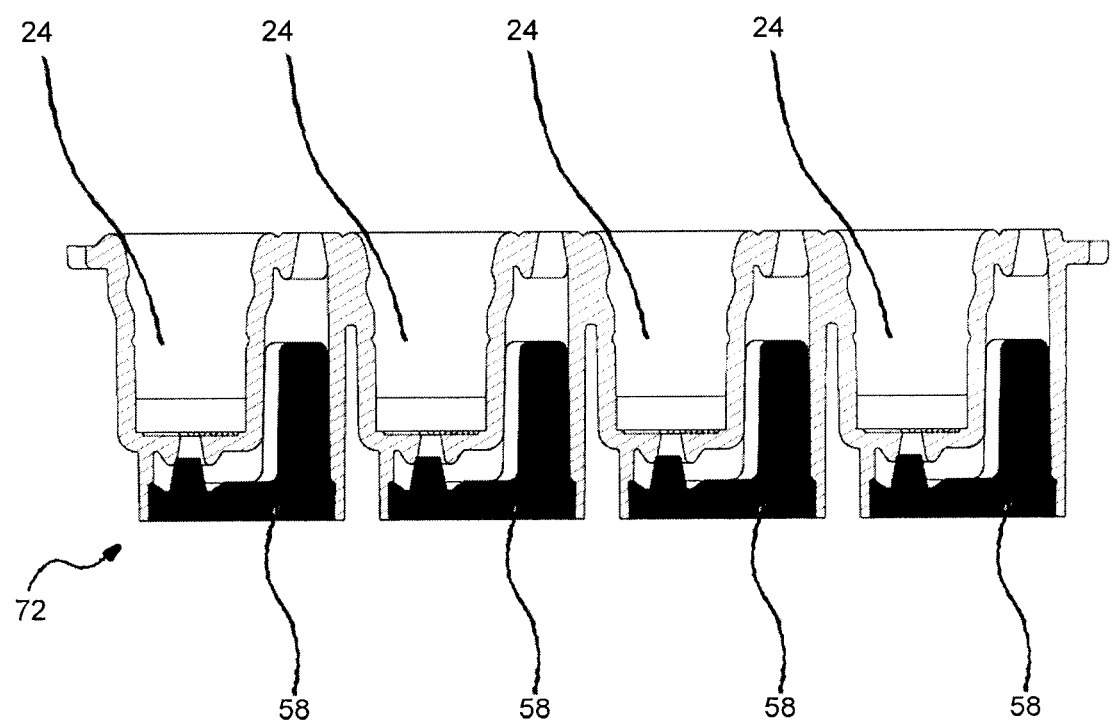
Figure 13B:
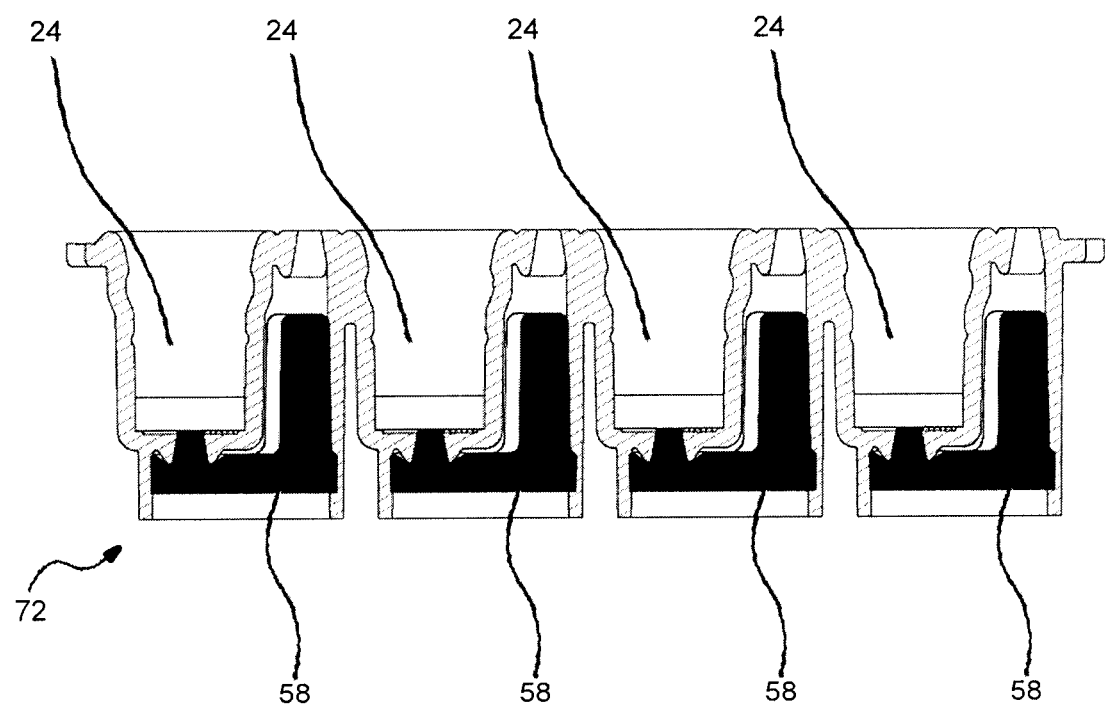

The capacity of the sealing device to stop flow between the inner reaction chamber and the output end of the reaction component was assessed. The sealing device was inserted into the output end and pushed to its closed/capped configuration by the automated apparatus, as shown in FIGS. 13A and 13B. Successful closure of the sealing device was observed for more than a hundred consecutive trials. To assess tightness of the seal, 30 microliters of water was deposited in the inner reaction chamber and the lid was sealed with a leak proof PCR tape. Water loss across the sealing device was measured by weighting the assembly after 24 and 120 hours. Usually, the device operation time is less than 12 hours and therefore the loss by evaporation or capillarity is negligible on a typical reaction volume of 10 to 50 microliters. Table 3 indicates the rate of leakage through the sealing device of the reaction component.

TABLE 3

Rate of leakage thorough reaction component's sealing device

| Time elapsed (hr) | Water loss (%) |
|---|---|
| 24 | 0.22 |
| 120 | 1.96 |

Example 5—Reaction Device's Capping Component Resistance to Leaking

In this example, the resistance to leaking of the capping component when engaged into the input end was assessed. For this essay, the inner reaction chamber was filled with 30 microliters of water and the capping component closed. The device was flipped to put the fluid in contact with the seal. Water loss across the capping component was measured by weighting the assembly after 24 and 120 hours. Table 4 indicates the rate of leakage through the device's capping component.

TABLE 4

Rate of leakage through device's capping component

| Time elapsed (hr) | Water loss (%) |
|---|---|
| 24 | 0.92 |
| 120 | 3.77 |

Figure 12:
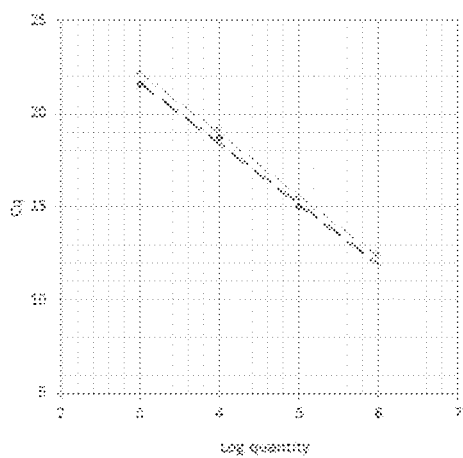
FIG. 12 shows a graph of the linear fluorescence response being measured through the optically clear inner reaction chamber of an analytical device according to one embodiment of the present technology. $y=5578.9x+1935,9$; $R^2=0.9999$.

Example 6—Linear Fluorescence Measured Thorough an Optically Clear Inner Reaction Chamber The capacity to read a fluorescence signal with the fluorescence module of the automatized apparatus by excitation and emission across the optically clear portion of the inner reaction chamber was assessed. Two concentrations of fluorescein (0.625 µg/mL and 2.5 µg/mL) and a blank were measured by the detector. FIG. 12 shows the linear fluorescence response being measured thorough the optically clear inner reaction chamber.

Example 7—Solid Reagents being Properly Delivered from the Reagents Receiving Compartment The capacity to add solid reagents to the inner reaction chamber using the reagent receiving compartment, those reagents passing thorough the inner cavity of the capping component, was assessed. For this, the reagent receiving compartment was built with a flexible elastomer on top of an aluminum sealed reagent storing compartment where solid biochemistry was stored. The assembled cartridge was manipulated by the automated apparatus leading to the closing/capping of the capping component and a triggered delivery of the solids by pressing on the flexible top, thereby pushing the solid biochemistry thorough the aluminum layer and into the inner reaction chamber across the inner cavity of the capping component. The delivery was facilitated by a cutting carriage to break the aluminum layer. Using the cutting carriage C, a 100% success rate was achieved over 38 consecutive trials. Table 5 indicates the addition of solid reagents using the reagent storing compartment.

TABLE 5

Addition of solid reagents using the reagent storing compartment

| Model | Successful deliveries | Failed deliveries | Success rate (%) |
|---|---|---|---|
| A | 10 | 2 | 83 |
| B | 4 | 4 | 50 |
| C | 38 | 0 | 100 |

What is claimed is:
1. An analytical device for automated detection and/or quantification of a nucleic acid within a fluid sample; the analytical device comprising a plurality of reaction components, each of the plurality of reaction components comprising:

(a) a reaction chamber suitable for (1) trapping and (2) detecting and/or quantifying the nucleic acid within the fluid sample, the reaction chamber comprising:
  (i) an input end for receiving the fluid sample and/or reagents or other liquids into the reaction chamber;
  (ii) a trapping element disposed in the reaction chamber for trapping the nucleic acid therein; and
  (iii) an output end located below the trapping element suitable to eliminate a liquid portion of the fluid sample and/or the reagents or other liquids from the reaction chamber;
(b) a conduit in fluid communication with the output end and with a waste collection system for retaining the liquid portion of the sample passing through the output end;
(c) a capping component for releasably sealing the input end of the reaction chamber wherein the capping component comprises a reagent receiving compartment; and
(d) a sealing device for releasably sealing the output end of the reaction chamber after the liquid portion of the sample has passed therethrough and/or before said detecting and/or quantifying, wherein the sealing device is a cap, a septum, a lid or a plug;
wherein the analytical device is at least partially optically clear and is suitable to receive heat, such that the analytical device is suitable for said detecting and/or quantifying said nucleic acid after said sealing of the input end and said sealing of the output end;
wherein said detecting and/or quantifying comprises a nucleic acid amplification technology (NAAT).

2. The analytical device as defined in claim 1, wherein the capping component comprises a lid having a capping portion.

3. The analytical device as defined in claim 1, wherein the reagent receiving compartment comprises a reagent storing compartment and a flexible cover.

4. The analytical device as defined in claim 3, wherein the reagent receiving compartment further comprises at least one protective layer.

5. The analytical device as defined in claim 4, wherein the reagent storing compartment comprises an inner chamber in fluid communication with the reaction chamber.

6. The analytical device as defined in claim 1, wherein the input end or the output end or both interface with a device capable of building differential hydraulic and pneumatic pressure into the reaction chamber.

7. The analytical device as defined in claim 1, wherein the trapping element comprises one or more of a membrane, filter, paper, glass wool, polymer, gel, resin, bead matrix, magnet matrix, antibody coated matrix, nucleic acid probe coated matrix, aptamer coated matrix and chemical impregnated paper and chemical impregnated membrane.

8. The analytical device as defined in claim 7, wherein the membrane is selected from polypropylene, track-etched polycarbonate, track-etched polyester, cellulose acetate, mixed cellulose esters, nitrocellulose, nylon, polyvinylidene fluoride, polytetrafluoroethylene and polyethersulfone.

9. A method for performing an analytical quantification and/or detection of a nucleic acid in a fluid sample, the method comprising:
  introducing the fluid sample into the reaction chamber of the analytical device as defined in claim 1, such that the nucleic acid is trapped therein and the liquid portion of the sample is eliminated through the output end;
  optionally, washing the reaction chamber with a wash fluid;
  introducing one or more reagents suitable for the analytical detection and/or quantification of the nucleic acid into the reaction chamber;
  sealing the input end and the output end of the reaction chamber; and
  detecting and/or quantifying the nucleic acid in the reaction chamber.

10. The method of claim 9, wherein said detecting and/or quantifying the nucleic acid in the reaction chamber comprises using nucleic acid amplification technology.

11. The analytical device as defined in claim 1, wherein the reagent receiving compartment comprises reagents for said NAAT.

12. The analytical device as defined in claim 11, wherein said reagents comprise nucleotides, oligonucleotide primers, salts, buffers, acids, bases, chaotropic agents, enzymes, antibodies, antigens, peptides, enzymatic substrates, and/or chemicals.

13. The analytical device as defined in claim 1, wherein the device is configured for attachment to a thermal sleeve capable of providing heat in a controlled manner.

14. The analytical device as defined in claim 1, wherein the trapping element comprises a microporous filter for capturing microorganisms, wherein the porosity of the filter is between 0.2 and 500 μm.

15. The analytical device as defined in claim 1, wherein the volume of the reaction chamber is between 10 and 500 μL.

16. The analytical device as defined in claim 1, wherein the thickness of the thinnest walls of the analytical device is between 0.2 and 5 mm.

17. The method of claim 1, wherein said other reagents or liquids comprise nucleotides, oligonucleotide primers, salts, buffers, acids, bases, chaotropic agents, enzymes, antibodies, antigens, peptides, enzymatic substrates, chemicals, lysis solution, and/or wash fluid.

18. The method of claim 1, wherein said input end is configured for receiving said fluid sample and said reagents or other liquids at different times.

* * * * *